United States Patent
Kundu et al.

(10) Patent No.: US 7,363,538 B1
(45) Date of Patent: Apr. 22, 2008

(54) COST/BENEFIT BASED CHECKPOINTING WHILE MAINTAINING A LOGICAL STANDBY DATABASE

(75) Inventors: Joydip Kundu, Nashua, NH (US); Qingin Wang, Nashua, NH (US); Anthony J. Adams, Mason, NH (US)

(73) Assignee: Oracle International Corporation, Redwood Shores, CA (US)

( * ) Notice: Subject to any disclaimer, the term of this patent is extended or adjusted under 35 U.S.C. 154(b) by 450 days.

(21) Appl. No.: 10/158,226

(22) Filed: May 31, 2002

(51) Int. Cl.
*G06F 11/00* (2006.01)

(52) U.S. Cl. .................. 714/16; 714/15; 707/202; 707/204

(58) Field of Classification Search .................. 714/16, 714/19; 707/202, 204
See application file for complete search history.

(56) References Cited

U.S. PATENT DOCUMENTS

| | | | |
|---|---|---|---|
| 5,574,897 A * | 11/1996 | Hermsmeier et al. .......... 707/1 |
| 5,758,359 A * | 5/1998 | Saxon ........................ 707/204 |
| 6,769,074 B2 * | 7/2004 | Vaitzblit ..................... 714/16 |
| 6,799,189 B2 * | 9/2004 | Huxoll ....................... 707/204 |
| 6,820,217 B2 * | 11/2004 | Mock et al. .................. 714/15 |
| 6,834,358 B2 * | 12/2004 | Korenevsky et al. ......... 714/15 |
| 7,055,063 B2 * | 5/2006 | Leymann et al. ............. 714/16 |
| 2006/0202083 A1 * | 9/2006 | Milde, Jr. .................. 244/12.6 |

OTHER PUBLICATIONS

Krishna et al. "Optimization Criteria for Checkpoint Placement." Communications of the ACM. vol. 27, No. 10, Oct. 1984, pp. 1008-1012.*
Erol Gelenbe. "On the Optimal Checkpoint Interval." Journal of the Association for Computing Machinery. vol. 26, No. 2, Apr. 1979, pp. 259-270.*

* cited by examiner

*Primary Examiner*—Robert Beausoliel
*Assistant Examiner*—Philip Guyton
(74) *Attorney, Agent, or Firm*—Bingham McCutchen LLP (57) ABSTRACT

A method, system, and computer program product for generating checkpoint information in a database management system that determines the frequency of checkpointing of transactions based on a cost/benefit tradeoff analysis. A method for generating checkpointing information in a database management system comprises the steps of generating redo information based on transactions processed by the database management system, determining a cost of recovery using the redo information, determining a cost of taking a checkpoint, receiving a user specification of acceptable recovery delay and acceptable checkpoint overhead, and taking a checkpoint when cost effective to do so based on the cost of recovery using the redo information, the cost of taking the checkpoint and the user-specified acceptable delay and overhead.

15 Claims, 10 Drawing Sheets

COST/BENEFIT BASED CHECKPOINTING WHILE MAINTAINING A LOGICAL STANDBY DATABASE

FIELD OF THE INVENTION

The present invention relates to a method, system, and computer program product for generating checkpoint information in a database management system.

BACKGROUND OF THE INVENTION

A logical standby database is a logical replica of a source or primary database, which is kept, synchronized with the source database. Synchronization may be accomplished in a variety of ways. For example, the SQL statements may be extracted out of the redo log stream generated by the source database, and the extracted SQL statements may be re-executed in the same order that they were executed in the source database. Other techniques for synchronizing a logical standby database are also possible.

In order to synchronize a logical standby database using statements extracted from a redo stream, two main functions must be performed. First, a log analysis component must analyze the redo stream to generate transactions that were executed in the source database and their order of execution. Second, an apply component must re-execute these extracted transactions in the given order to synchronize the logical standby database with the primary database. The log analysis component processes the redo records to extract the equivalent of original data manipulation language (DML) statement that produced the records, DMLs belonging to the same transaction are grouped together and committed transactions are returned to the apply component.

Only committed transactions can be re-executed by the apply component on the standby database, whereas the redo stream contains data relating to both committed and uncommitted transactions. Thus, although at the standby database all committed transactions may have been extracted and applied on the standby database, there can also be uncommitted transactions that originated quite far back in time. This means that data relating to these uncommitted transactions may be present in a large number of redo log files. A system crash at this point will require re-processing all these redo log files in order to extract the data related to the uncommitted transactions. This can cause a long delay in crash recovery. Even worse, if there is a "rogue" transaction that has a small number of DMLs associated with it, but is long in-duration, such a re-processing will cause long and inefficient delay in crash recovery.

One solution is to checkpoint the uncommitted transactions periodically, so that a system crash will not necessitate re-processing of the redo logs. However, a problem arises in determining how often such a checkpoint needs to occur. There is a cost/benefit tradeoff between frequency of checkpointing, performance of the system at steady state, and crash recovery time. The higher the frequency of checkpointing, the lower the time to recover from a crash, but the worse the steady state performance.

Thus, a need arises for a technique to determine the frequency of checkpointing of transactions based on a cost/benefit tradeoff analysis.

SUMMARY OF THE INVENTION

The present invention is a method, system and computer program product for generating checkpoint information in a Logical Standby database management system that determines the frequency of checkpointing of transactions based on a cost/benefit tradeoff analysis.

In one embodiment of the present invention, a method for generating checkpointing information in a Logical Standby database management system comprises the steps of receiving a user specification of cost-effectiveness of taking a checkpoint. The step of receiving a user specification of cost-effectiveness of taking a checkpoint comprises the steps of receiving a user specification of acceptable crash recovery delay and receiving a user specification of acceptable checkpoint overhead.

The present invention also contains a method for generating checkpointing information in a Logical Standby database management system comprising the steps of generating redo information based on transactions processed by the database management system, determining a cost of recovery using the redo information, determining a cost of taking a checkpoint, and taking a checkpoint when cost effective to do so based on the cost of recovery using the redo information and on the cost of taking the checkpoint and comparing it with user supplied parameters to ensure that user expectation is satisfied. The step of determining the cost of recovery using the redo information comprises the steps of determining a cost of recovery using the redo information from a first checkpoint to a second checkpoint with no checkpoint between the first checkpoint and the second checkpoint and determining a cost of recovery using the redo information from a first checkpoint to a second checkpoint with a third checkpoint between the first checkpoint and the second checkpoint. The step of taking a checkpoint based on the cost of recovery using the redo information and on the cost of taking a checkpoint comprises the step of taking the third checkpoint if the cost of recovery using the redo information from a first checkpoint to a second checkpoint with a third checkpoint between the first checkpoint and the second checkpoint is less than the cost of recovery using the redo information from a first checkpoint to a second checkpoint with no checkpoint between the first checkpoint and the second checkpoint. The step of determining a cost of recovery using the redo information from a first checkpoint to a second checkpoint with a third checkpoint between the first checkpoint and the second checkpoint comprises the steps of determining a cost of taking the third checkpoint, determining a cost of recovery using the redo information from the third checkpoint to the second checkpoint, and summing the cost of taking the third checkpoint and the cost of recovery using the redo information from the third checkpoint to the second checkpoint.

In one aspect of the present invention, the method further comprises the step of receiving a user specification of cost-effectiveness of taking a checkpoint. The step of receiving a user specification of cost-effectiveness of taking a checkpoint comprises the steps of receiving a user specification of acceptable crash recovery delay and receiving a user specification of acceptable checkpoint overhead.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

Figure 1:
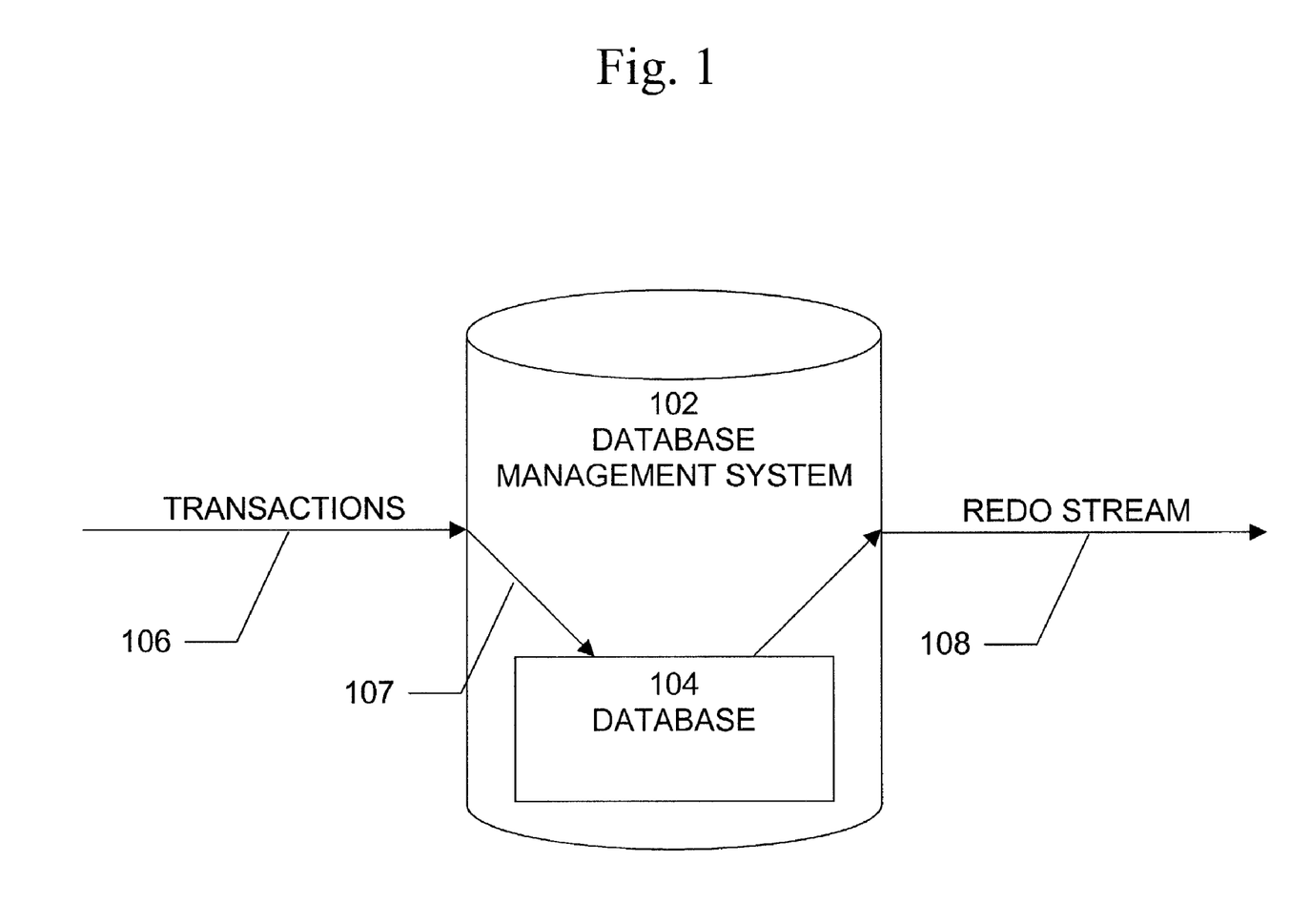
FIG. 1 is an exemplary block diagram of a database management system (DBMS), in which the present invention may be implemented.

An exemplary database management system (DBMS) 102, in which the present invention may be implemented, is shown in FIG. 1. Database management system (DBMS) 102 provides the capability to store, organize, modify, and extract information from one or more databases included in DBMS 102. From a technical standpoint, DBMSs can differ widely. The terms relational, network, flat, and hierarchical all refer to the way a DBMS organizes information internally. The internal organization can affect how quickly and flexibly you can extract information.

Each database included in DBMS 102 includes a collection of information organized in such a way that computer software can select and retrieve desired pieces of data. Traditional databases are organized by fields, records, and files. A field is a single piece of information; a record is one complete set of fields; and a file is a collection of records. An alternative concept in database design is known as Hypertext. In a Hypertext database, any object, whether it be a piece of text, a picture, or a film, can be linked to any other object. Hypertext databases are particularly useful for organizing large amounts of disparate information, but they are not designed for numerical analysis.

Typically, a database includes not only data, but also low-level database management functions, which perform accesses to the database and store or retrieve data from the database. Such functions are often termed queries and are performed by using a database query language, such as Structured Query Language (SQL). SQL is a standardized query language for requesting information from a database. Historically, SQL has been a popular query language for database management systems running on minicomputers and mainframes. Increasingly, however, SQL is being supported by personal computer database systems because it supports distributed databases (databases that are spread out over several computer systems). This enables several users on a local-area network to access the same database simultaneously.

Most full-scale database systems are relational database systems. Small database systems, however, use other designs that provide less flexibility in posing queries. Relational databases are powerful because they require few assumptions about how data is related or how it will be extracted from the database. As a result, the same database can be viewed in many different ways. An important feature of relational systems is that a single database can be spread across several tables. This differs from flat-file databases, in which each database is self-contained in a single table.

DBMS 102 may also include one or more database applications, which are software that implements a particular set of functions that utilize one or more databases. Examples of database applications include:
  computerized library systems
  automated teller machines
  flight reservation systems
  computerized parts inventory systems Typically, a database application, includes data entry functions and data reporting functions. Data entry functions provide the capability to enter data into a database. Data entry may be performed manually, by data entry personnel, automatically, by data entry processing software that receives data from connected sources of data, or by a combination of manual and automated data entry techniques. Data reporting functions provide the capability to select and retrieve data from a database and to process and format that data for other uses. Typically, retrieved data is used to display information to a user, but retrieved data may also be used for other functions, such as account settlement, automated ordering, numerical machine control, etc.

DBMS 102 includes one or more databases, such as database 104. Database 104 includes one or more data tables. One or more streams of transactions, such as transaction stream 106, are input to DBMS 102. A transaction is any database operation that may result in a change to database 104 or to the data stored in database 104. Each transaction includes one or more Data Manipulation Language (DML) statements 107, which are used to store, retrieve, modify, and erase data from database 104. The performance of the DML statements 107 making up each transaction results in changes being made to the data stored in database 104. These changes are used to generate redo stream 108, which may be output from DBMS 102. Redo stream 108 includes a plurality of redo records, in which each redo record specifies one or more changes that were made to the database or to the data stored in the database.

Transaction stream 106 includes a plurality of transactions, which include commands and/or statements that cause the performance of database operations that may result in a change to database 104 or to the data stored in database 104. The commands and/or statements included in transaction stream 106 may be DML statements, or they may be higher-level commands, such as Application Program Interface (API) calls. Where transaction stream 106 includes API calls, these calls typically are converted to DML statements 107, in order for the transactions to be performed. Where transaction stream 106 includes DML statements, in some embodiments, the DML statements may be performed directly, while in other embodiments, the DML statements may be converted to lower-level DML statements, which are then performed. For example, in some embodiments, transaction stream 106 may include DML statements, such as SQL statements, the SQL statements may be performed directly. In other embodiments, transaction stream 106 may include DML statements, such as SQL statements, but the SQL statements are converted to lower-level DML statements, which are then performed.

Typically, in order to use redo stream 108, the redo records are processed to reconstruct the equivalent DML statement that produced them. DML statements DMLs belonging to the same transaction are grouped together and committed transactions are returned to the application.

Figure 2:
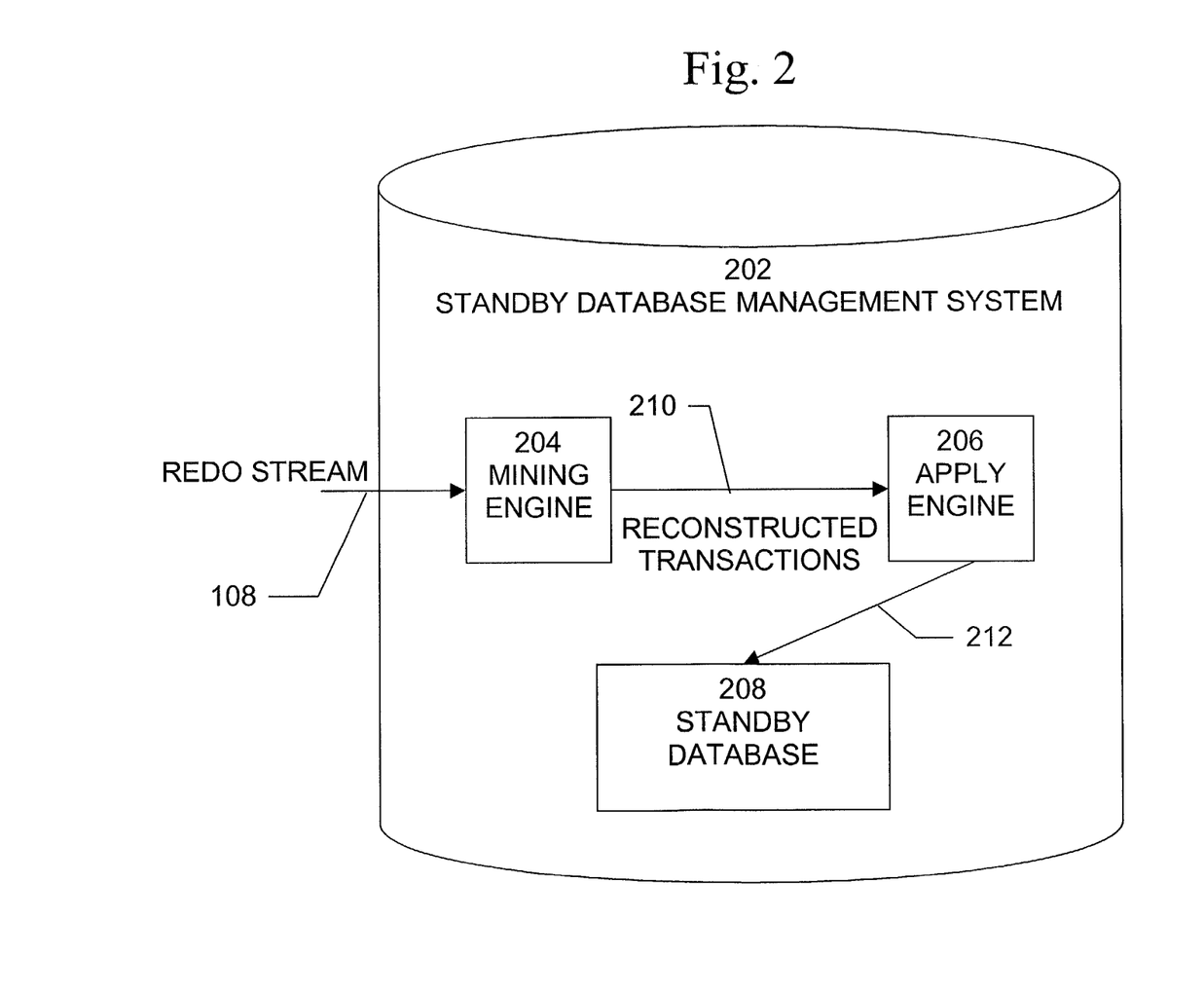
FIG. 2 is an exemplary block diagram of a standby database management system, which is performing a process of recovery in the context of Logical Standby.

An exemplary block diagram of standby DBMS 202, which is performing a process of recovery in the context of Logical Standby, is shown in FIG. 2. Standby DBMS 202 includes mining engine 204, apply engine 206, and standby database 208. Mining engine 204 reads the redo logs included in redo stream 108 and reconstructs the original transactions 210, typically in memory of standby DBMS 202. Apply engine 206 reads the reconstructed transactions from memory and applies 212 them to standby database 208 to recreate the original database in standby database 208. Together, mining engine 204 and apply engine 206 form a pipeline in which mining engine 204 is producing work for the apply engine 206 to consume. In order to maintain throughput, the mining engine 204 is always ahead of apply engine 206. For example, when the mining engine 204 is assembling transactions executed in the primary DBMS at time "t+d", apply engine 206 is consuming transactions executed at "t".

For example, assume a transaction T started at 11 AM in the morning, performed one DML operation, did nothing for a long time and committed at 4:01 PM in the afternoon. Assume all other transactions that started after 11 AM committed before 4 PM. If the standby system crashes before processing the commit of T, in order to get back T it needs to reread the redo logs generated over those 5 hours. Thus although only one transaction T was outstanding from the redo records generated in the 5 hours, the standby has to spend time rereading all the redo logs for all transactions, including those that have committed, in order to recover from a crash. However, if a checkpoint was taken of the transaction T's work, it would only be necessary to read from the checkpoint information. It would not be necessary to read 5 hours worth of redo data.

In general, checkpointing is process whereby the state of a computation is saved periodically so as to aid in crash recovery. In the most general sense, assume a set of transformations is being applied to a variable X. For simplicity, assume that each transformation takes T time to apply, and there are S transformations needed to be applied to get the final value of X. In this situation, the time needed to get the final value of $X=S \times T$. If the system crashes after Y transformations have been applied, then it is necessary to restart from the beginning, and the total time taken to compute the final value of X will be $=S \times Y+S \times T$. In this case $S \times Y$ time is wasted because of a system crash. If the system crashes twice, the cost of the computation goes up (in this case $2 \times S \times Y+S \times T$).

Now assume checkpoints are taken whereby the value of X and all related states required to restart the computation are saved after each transformation of X. Assume the time taken to take a checkpoint is C, and the time to read the checkpoint information is also C (In general the time to read the checkpoint information may be a little less than C). Then the time taken to finish the computation without a system crash $=S \times T+S \times C$. If the system crashes, the total time to finish the computation will be $=S \times T+S \times C+C$. Since the number of transformations can be safely assumed to be much larger than the number of crashes we are likely to encounter, the total cost is almost independent of number of times the system crashes, and for all practical purposes be approximated as $\sim(S \times T+S \times C)$.

Figure 3:
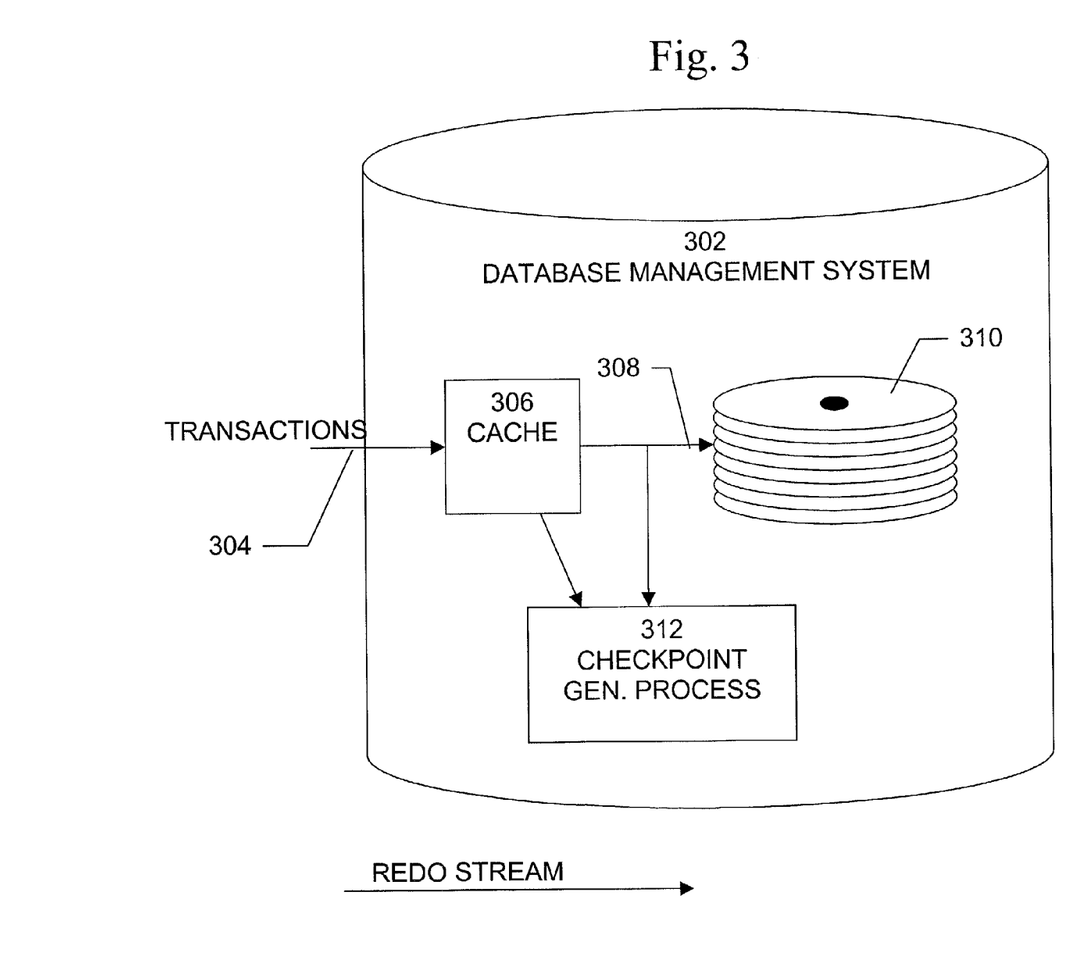
FIG. 3 is an exemplary block diagram of a database management system, in which the present invention may be implemented.

Checkpointing techniques are used in a DBMS in other contexts as well. One such example is a database management system (DBMS) 302 is shown in FIG. 3. DBMS user transactions 304 modify data buffers resident in cache 306, while a dirty buffer write process 308 writes the dirty buffers out to committed storage 310, which is typically hard disk storage. Checkpointing process routines 312 determines when checkpointing of transactions handled by DBMS Checkpointing process 312 keeps track of which buffers have been written out by dirty buffer write process 308 so that they need not be read back and re-executed during recovery.

Checkpointing mechanisms are also used in other types of computations like massively parallel scientific computations.

Some terms that are useful in understanding the present invention are defined as follows:

$CC(x) =$ Cost of taking a checkpoint $x$, taken at time $x$.

$RWO(c1, c2) =$

Recomputation cost to go from checkpoint $c1$ taken at time $c1$, to checkpoint $c2$, taken at time $c2$, in absence of any checkpoint in-between.

$RW(c1, c2) =$ Recomputation cost to go from checkpoint $c1$ to $c2$ if there is a checkpoint $x$ in-between;

$=$ Cost of taking a checkpoint at $x +$ Recomputation cost to go from checkpoint $x$ to checkpoint $c2$ in absence of any checkpoint in-between;

$= CC(x) + RWO(x, c2)$.

In a dynamic environment like an RDBMS cost of taking a checkpoint is not constant. A checkpoint should only be taken if $(CC(x)+RWO(x,c2))/RWO(c1,c2)<1$. Also since system crashes are rare, the above ratio should be as close to 0 as possible. The present invention allows the user to specify the maximum allowable ratio.

The computation of this ratio can be done in several ways. The straight-forward way is to compute the cost by examining the data to be checkpointed (CC(x)) and keep some metric that let us determine RWO(a, b).

In the context of a Logical Standby database the time taken to mine redo records is much less than the time taken to generate the redo records i.e., if it takes Y seconds to generate 1 Mbytes worth of redo record and it takes X seconds to mine 1 MB worth of redo record, then X is typically much smaller than Y (X<<Y). So if the user specified an acceptable delay of D secs then during crash recovery the mining engine safely re-read YxD/X seconds worth of redo records without jeopardizing our guarantee to the user. Assume the source database is generating redo records at a uniform rate. Thus when the apply engine is applying redo records generated at time "t", only redo records generated earlier than "t−YxD/X" needs to be considered for checkpointing. Say it takes 20 times less for the mining engine to read data as compared to the source database to generate the data (i.e., Y/X=20) and the user has specified an acceptable crash recovery delay of 2 minutes, then for an apply engine consuming redo records generated at time "t" only redo records generated before "t-40 mins" need to be considered. Since the source database redo generation rate is not uniform, the determination can be transformed into actual amount of redo records. Say the mining engine can process M bytes of redo/sec. Then in D secs, it can process DxM bytes of redo. Thus at any given time, it only needs to consider redo records that are beyond "MxD" bytes from its present point of operation.

As is evident from the discussion above, the computation of approximate estimate for RWO(x, y) in our context is relatively straightforward. If the mining engine's processing rate is M bytes of redo/sec, and there are R bytes of redo between x and y, then RWO(x, y) R/M sec.

However computation of CC(x) can be time-consuming. At every time point "x" where a checkpoint can be taken, the cost of taking a checkpoint must be computed. This translates into walking different memory structures and determining whether they can be part of Checkpoint x and then computing the cost of saving that memory structure on-disk.

In the present invention, the steady state system keeps track of time periods where a checkpoint is inadvisable. These time periods are kept in a sorted list. Thus at time "x" we see whether "x" is within any of the inadvisable time periods. This is a constant time operation, since the time periods are kept in a sorted list and we need to examine only the first element of the list. The determination of whether a checkpoint can be taken or not can thus be made in constant time and without having to determine the size or cost of the checkpoint.

In order to recover from a crash, the SQL statements are extracted out of the redo log stream generated by the source database, DBMS 302, and the extracted SQL statements are re-executed in the standby database, standby DBMS 202, in the same order that they were executed in the source DBMS 302. The transactions that have been committed, that is, written to committed storage 310 should not be re-executed.

Since it is not, in general, possible to predict the occurrence of a crash, the present invention provides the advantage of improving the cost/benefit tradeoff between checkpointing and processing the redo stream. Typically, the checkpoint overhead at any given time is much less than the benefit derived from the checkpoint. The present invention provides a user with the capability to control the checkpointing by setting a single parameter that specifies the maximum time to be spent processing log files during crash recovery. For example, the user may specify D seconds as the acceptable crash recovery interval. If M bytes/sec. is the redo processing rate, this implies that up to D×M bytes of redo records can be processed during crash recovery and still meet the user specified parameter.

It is to be noted that the workload may be such that the user request can not be satisfied. The present invention uses a best-effort strategy, which attempts to satisfy the user request, but avoids generating checkpoints that are not beneficial.

Figure 4:
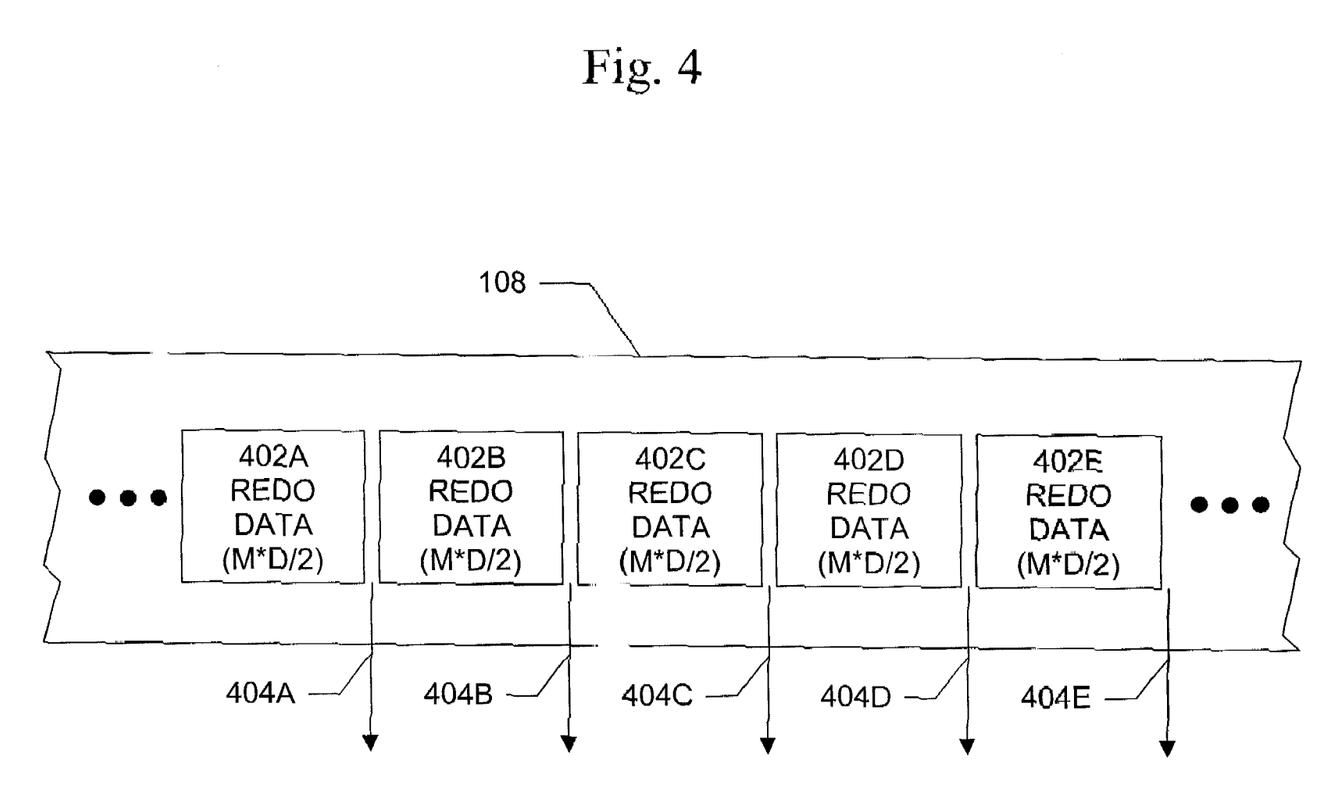
FIG. 4 is an exemplary data flow diagram of one embodiment of checkpoint processing using the user-specified crash recovery interval parameter.

One embodiment of checkpoint processing using the user-specified crash recovery interval parameter is shown in FIG. 4. Redo stream 108 is generated by the processing of transactions by the DBMS. Redo stream 108 includes redo data, such as blocks of redo files 402A-E. The checkpointing process is triggered by the processing of each block of redo files 402A-E, such as at points 404A-E and checkpoint data may be generated after each block of redo files. The size of each block of redo files 402A-E is determined based on the user specified crash recovery interval say D seconds, and on the redo-processing rate say M bytes/second of the DBMS. Thus, each block of redo files has a size of MxD/2 bytes of data.

As each block of redo files is processed, it is determined whether checkpointing will occur, such as at points 404A-E. For example, at points 404A and 404B, no action will be taken. At point 404C, DML statements related to uncommitted transactions that occurred before point 404A will be checkpointed if and only if the cost of performing the checkpointing is less than the cost of re-reading MxD/2 amount of redo records. In addition, the fact that system crashes are rare events is accounted for by never checkpointing part of a transaction that committed before the checkpointing process is triggered.

For example, assume that at point 404C there are two transactions, transaction X, which started before point 404A and which has not yet committed, and transaction Y, which started before point 404B and which committed before point 404C. Although, according to the user specified parameter, those parts of both transactions X and Y that occurred before point 404A should be checkpointed, the fact that Y has committed causes the checkpoint at point 404A to not contain the DMLs pertaining to Y.

Figure 5:
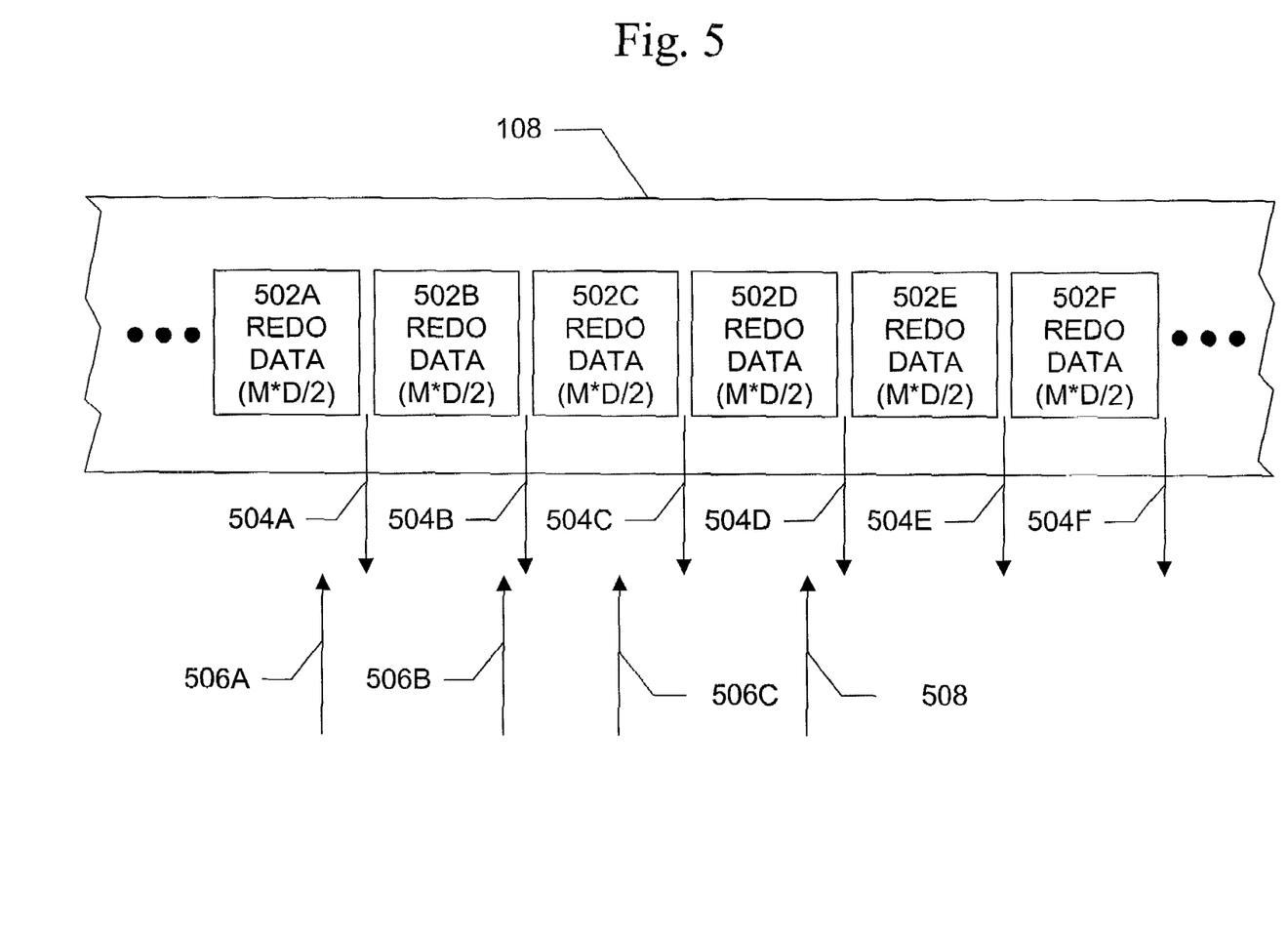
FIG. 5 is an exemplary data flow diagram of checkpoint processing.

One example of this processing is shown in FIG. 5. Each redo data block 502A-502E contains M*D/2 bytes of redo data. A transaction starts and performs three DMLs, one DML at each of time 506A, 506B, and 506C. The transaction then commits at time 508. At time 504C, when the checkpoint processing routines run, the checkpoint only includes one DML worth of data. Taking a checkpoint including the transaction is inexpensive and the checkpoint will be taken.

Figure 6:
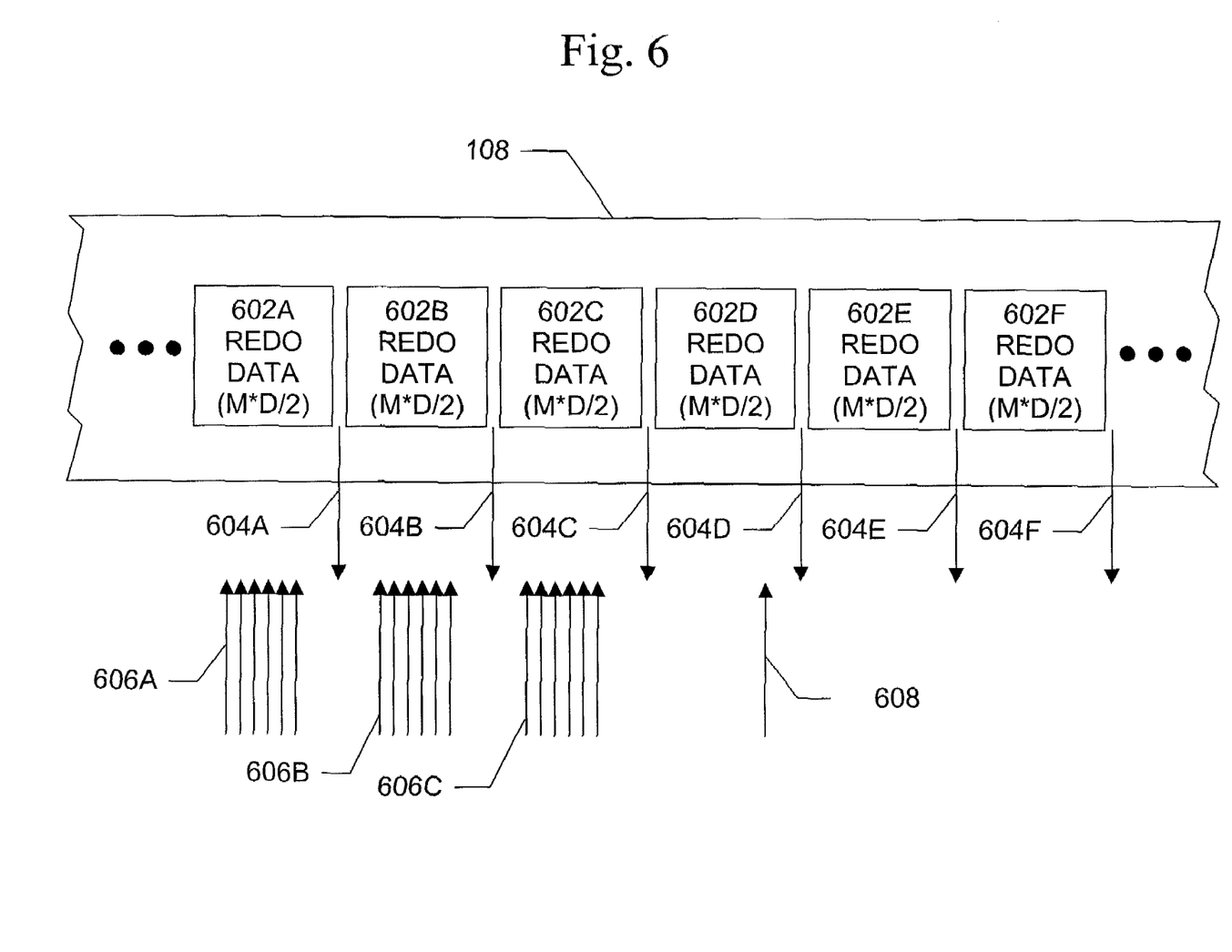
FIG. 6 is an exemplary data flow diagram of checkpoint processing.

Another example of this processing is shown in FIG. 6. In this example, a transaction starts and performs many DMLs at times 606A-C. For example, the transaction may perform 100,000 DMLs. A substantial number of DMLs, such as 20,000, are performed before time 604A. This transaction then commits at time 608. In this case, taking a checkpoint containing these 20,000 DMLs that occurred before time 604A is expensive. The checkpoint cost in this case is comparable to the cost of re-mining the MxD/2 bytes of redo data 602A that occurred before time 602A. When a transaction has a checkpoint cost comparable to the cost of re-mining MxD/2 bytes of redo data, this interval of the transaction should not be checkpointed. The checkpointing processing routines remember this interval over which a checkpoint should not be taken. In this example, the interval from the beginning of the transaction (the start of time 606A) to the time the transaction commits (time 608) will be marked as in-advisable interval for taking a checkpoint. No checkpoints will be taken for at times 604D and 604E as well. Only at time 604F will another checkpoint be taken. The determination of inadvisable checkpointing happens at mining time, and does not depend on size of the checkpoint.

Figure 7:
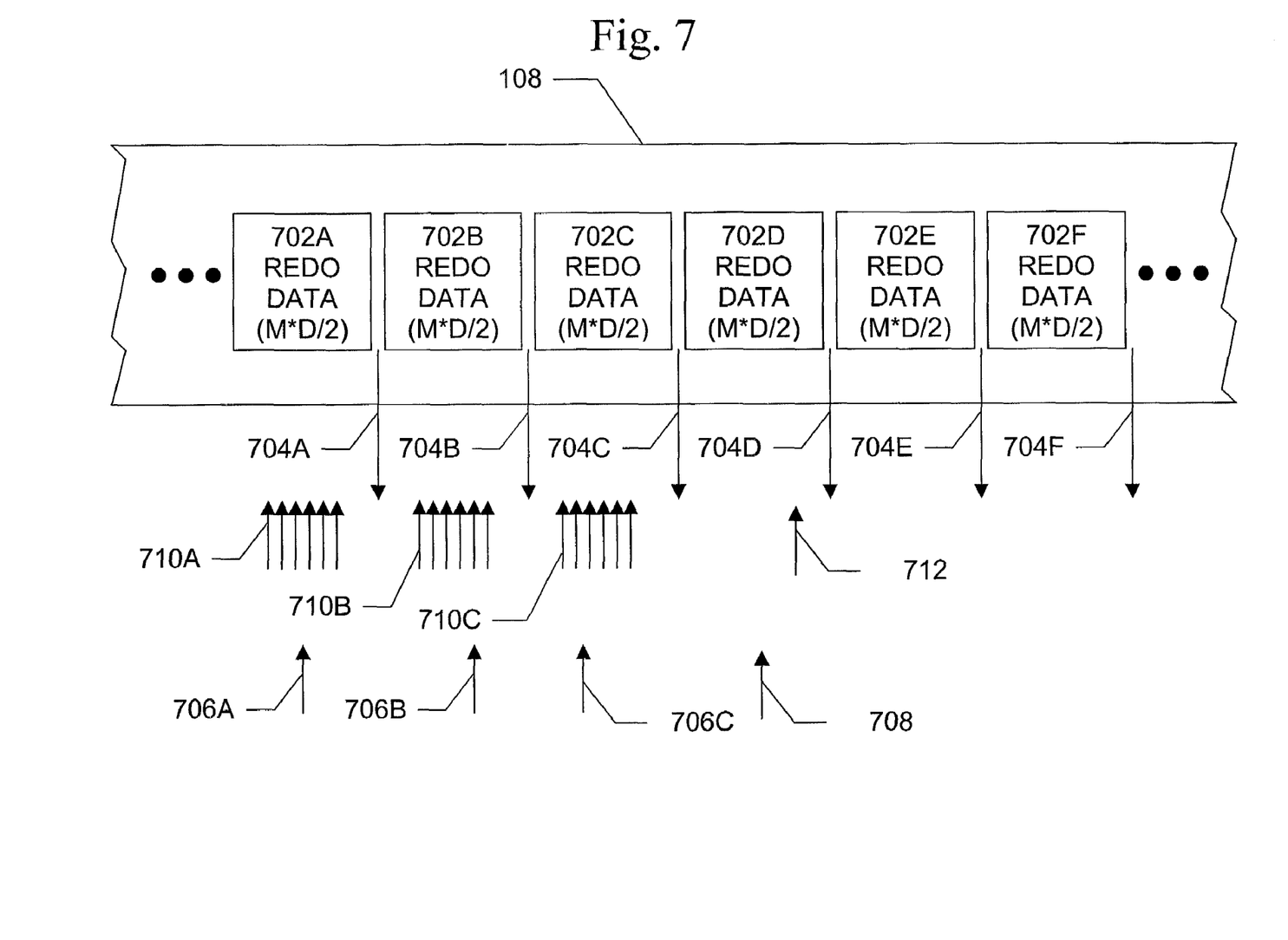
FIG. 7 is an exemplary data flow diagram of checkpoint processing.

Another example of this processing is shown in FIG. 7. In this example, there are two transactions. A first transaction starts and performs three DMLs, one DML at each of time 706A, 706B, and 706C. The transaction then commits at time 708. A second transaction starts and performs many DMLs at times 710A-C. For example, the transaction may perform 100,000 DMLs. A substantial number of DMLs, such as 20,000, are performed before time 704A. This transaction then commits at time 712. At time 704C, the checkpoint footprint for the first transaction is small enough, but checkpoint footprint for the second transaction is small enough. In the standard way of computing checkpoint cost, the cost of checkpointing the first transaction and the second transaction are determined individually. The sum of these costs is them computed and used to determine whether it is cost-effective to take the checkpoint. Thus the cost of determining the checkpoint is paid whether or not the checkpoint is taken. Preferably, the step of determining what is needed to be checkpointed is performed if and only if the time at which the checkpoint is to be taken is not in an inadvisable interval.

Figure 8:
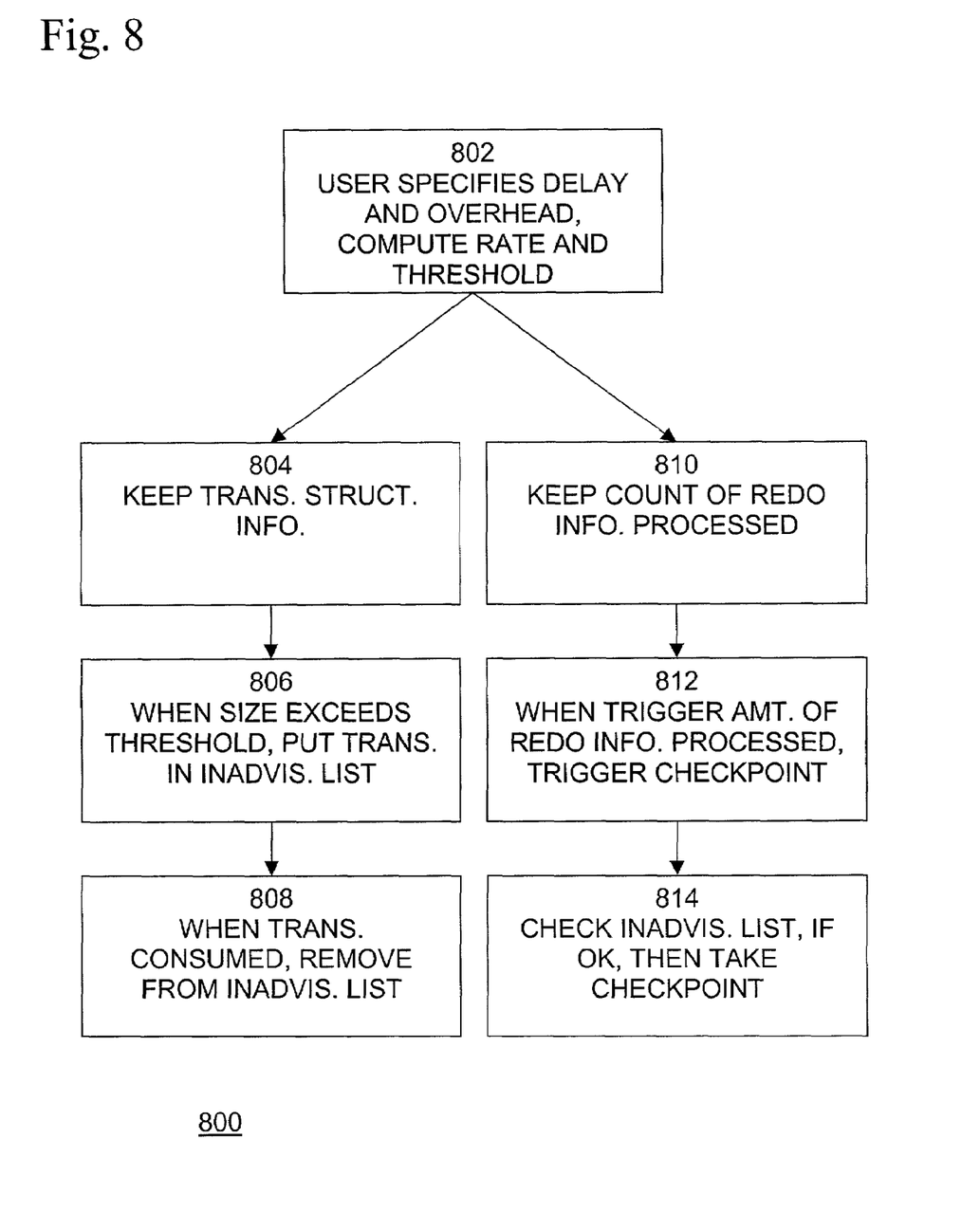
FIG. 8 is an exemplary flow diagram of a process of cost/benefit based checkpointing, according to the present invention.

A flow diagram of a process 800 for cost/benefit computation is shown in FIG. 8. The process begins with step 802, in which the user specifies D, the acceptable delay during recovery and R, the maximum acceptable overhead during steady state operation. The process computes M, the redo processing rate and the checkpoint threshold, which is MxDxR. Thus, if any checkpoint requires writing out MxDxR bytes of data, it becomes cost inefficient to take that checkpoint. For example, if D is set to 10 seconds, and R to 1% (i.e., 0.01) and M is computed to be 50 Mbytes/second, then the software will not take a checkpoint if it constitutes more than 50 Mbytes/sec×10 sec×0.01=5 Mbytes of data.

In step 804, for each transaction reconstructed from the redo log, the process keeps transaction structure information. The transaction structure information includes the total size of uncheckpointed redo records in the transaction, the lowest timestamp of the uncheckpointed redo record in the transaction (the earliest time corresponding to a DML that is not checkpointed), a transaction identifier, and whether or not the transaction has contributed to the inadvisable list. This information is kept with the memory structure associated with the transaction.

In step 806, if at any given point of time, a partial transaction T (for example, a transaction for which the process has not seen the commit) exceeds the checkpoint threshold, that is, the transaction contains more than MxDxR bytes of data, the transaction is entered in the inadvisable interval list. In particular, a tuple including the lowest timestamp of the uncheckpointed redo record in the transaction and the transaction identifier is put in the inadvisable interval list. The inadvisable interval list is sorted by the start time of every interval in the list. In step 808, when a transaction is consumed, that is, once the commit of the transaction is seen and is consumed by the apply engine, the interval corresponding to the transaction is removed from the inadvisable interval list.

In step 810, the process keeps track of three timestamps as the redo information is processed. These three timestamps are: X, the timestamp of redo record of an interval MxD bytes earlier than the checkpoint, Y, the timestamp of redo record of an interval MxD/2 bytes earlier than the checkpoint, and Z, the timestamp of the redo record at which the checkpoint is triggered. Thus, there are MxD/2 bytes worth of redo records between X and Y and MxD/2 bytes worth of redo records between Y and Z. In step 812, when the triggering amount, MxD/2, of redo information has been processed, (at time Z), checkpointing is triggered to checkpoint unconsumed redo records prior to X. In step 814, the process checks X with the first entry in the inadvisable list. If X>S in the first entry, then no checkpoint can be taken. Otherwise, redo information with timestamp before X are checkpointed.

For example, referring to FIG. 7, initially X=704A, Y=704B and Z=704C. When the checkpoint algorithm triggers at 704C, the inadvisable list contains the interval ((710A-710C), Transaction Identifier). Since 704A is greater than 710A, no checkpoint is taken.

For the next iteration X=704B, Y=704C and the checkpoint algorithm is not triggered until Z becomes 704D. Even in this iteration the checkpoint can not be taken since 704B>710A.

In the next iteration X=704C, Y=704D and Z=704E. Checkpoint is not taken since at 704D the transaction has still not been consumed, and hence still remains in the inadvisable list.

Only in the next iteration when X=704D, Y=704E and Z=704F does the transaction becomes complete and gets consumed by the apply engine. Once the apply engine consumes the transaction the entry ((((710A-710C), Transaction Identifier) is removed from the inadvisable list. At this point the checkpoint can be taken, since there is no entry in the inadvisable list.

Figure 9:
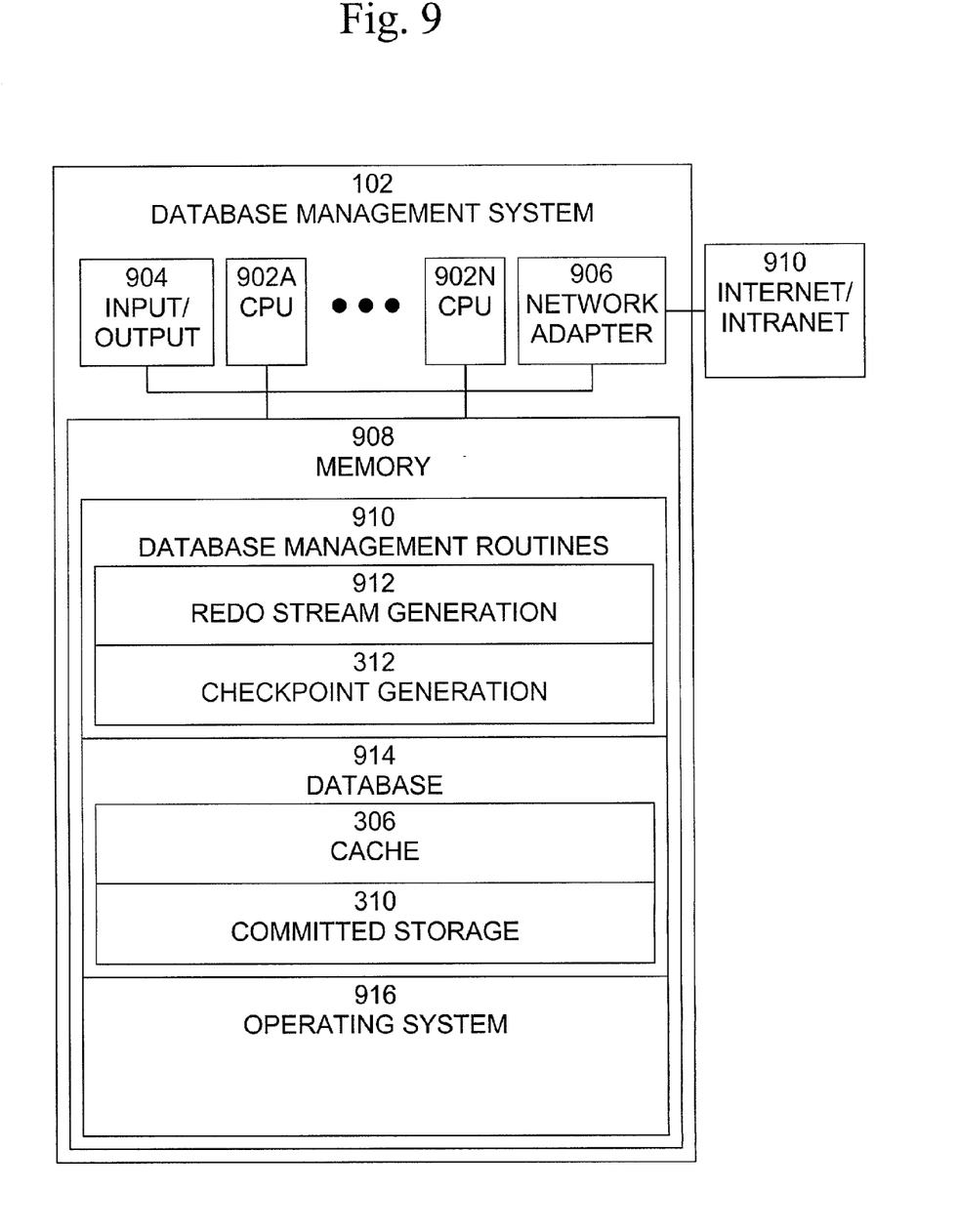
FIG. 9 is an exemplary block diagram of a database management system (DBMS), in which the present invention may be implemented.

An exemplary block diagram of a database management system (DBMS) 102, in which the present invention may be implemented, is shown in FIG. 9. DBMS 102 is typically a programmed general-purpose computer system, such as a personal computer, workstation, server system, and minicomputer or mainframe computer. DBMS 102 includes one or more processors (CPUs) 902A-902N, input/output circuitry 904, network adapter 906, and memory 908. CPUs 902A-902N execute program instructions in order to carry out the functions of the present invention. Typically, CPUs 902A-902N are one or more microprocessors, such as an INTEL PENTIUM® processor. FIG. 9 illustrates an embodiment in which DBMS 102 is implemented as a single multi-processor computer system, in which multiple processors 902A-902N share system resources, such as memory 908, input/output circuitry 904, and network adapter 906. However, the present invention also contemplates embodiments in which DBMS 102 is implemented as a plurality of networked computer systems, which may be single-processor computer systems, multi-processor computer systems, or a mix thereof.

Input/output circuitry 904 provides the capability to input data to, or output data from, database/DBMS 102. For example, input/output circuitry may include input devices, such as keyboards, mice, touchpads, trackballs, scanners, etc., output devices, such as video adapters, monitors, printers, etc., and input/output devices, such as, modems, etc. Network adapter 906 interfaces database/DBMS 102 with Internet/intranet 910. Internet/intranet 910 may include one or more standard local area network (LAN) or wide area network (WAN), such as Ethernet, Token Ring, the Internet, or a private or proprietary LAN/WAN.

Memory 908 stores program instructions that are executed by, and data that are used and processed by, CPU 902 to perform the functions of DBMS 102. Memory 908 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

In the example shown in FIG. 9, memory 908 includes database management routines 910, database 914, and operating system 916. Database management routines 910 include software routines that provide the database management functionality of DBMS 102. Database management routines typically include a database query language interface, such as a Structured Query Language (SQL) interface, a Data Manipulation Language (DML) interface, and database processing routines to carry out the data manipulations specified by the DML. For example, an SQL interface accepts database queries using the SQL database query language, converts the queries to a series of DML statements, calls the database processing routines to perform the series of DMLs, and returns the results of the query to the source of the query.

Database management routines 910 include redo stream generation routines 912 and checkpoint generation routines 312. Redo stream generation routines 912 generate a redo stream based on the performance of the DML statements making up each transaction that is handled by DBMS 102. The performance of the DML statements changes being made to the data stored in database and these changes are used by redo stream generation routines 912 generate to generate redo stream 108. Checkpointing process routines 312 determines when checkpointing of transactions handled by DBMS 102 should be performed, according to the present invention. Checkpointing process routines 312 keeps track of which buffers have been written out by dirty buffer write process 204 so that they need not be read back and re-executed during recovery.

Operating system 918 provides overall system functionality.

As shown in FIG. 5, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and WINDOWS®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

Figure 10:
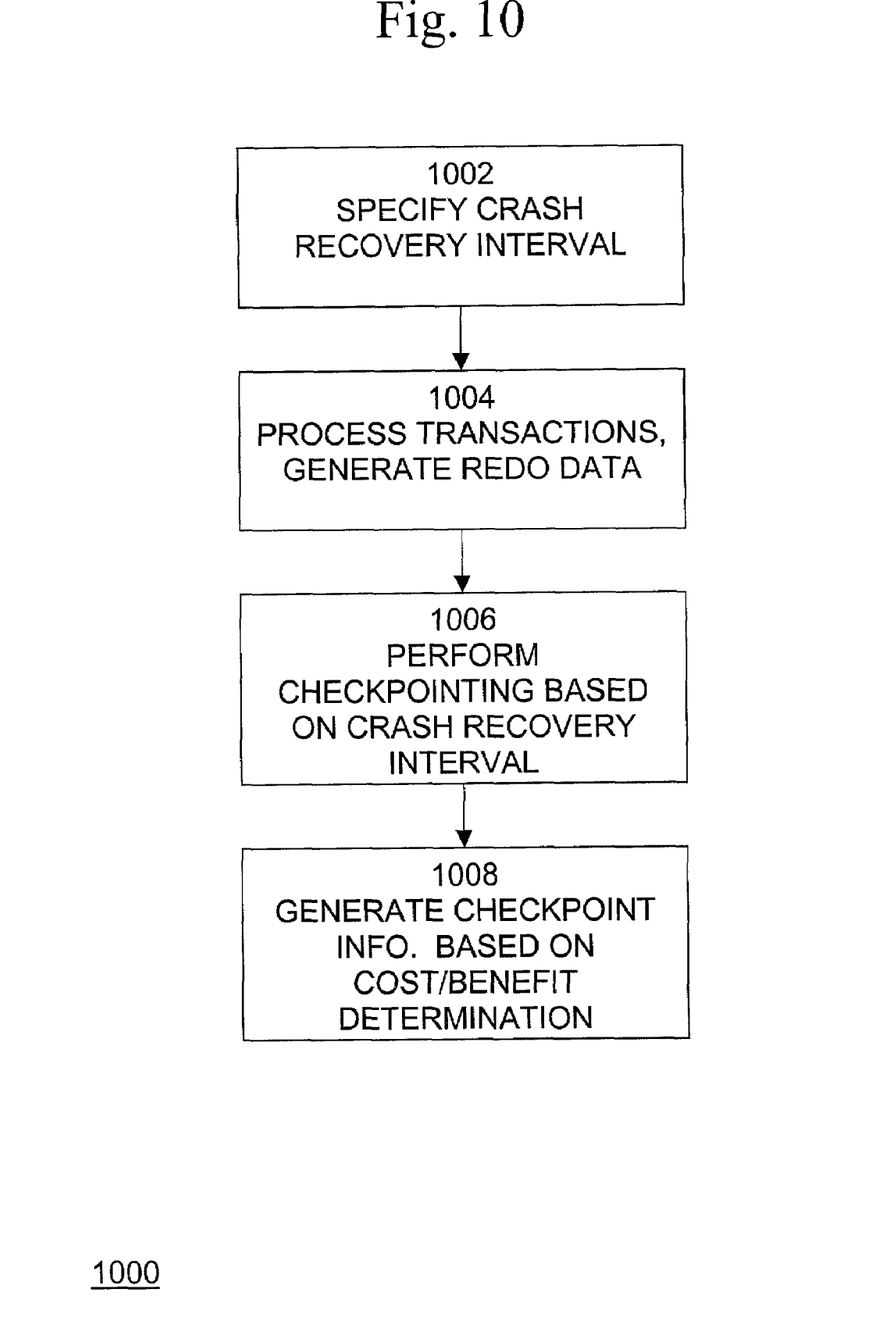
FIG. 10 is a flow diagram of a process for generating checkpoint information.

A process 1000 for generating checkpoint information is shown in FIG. 10. Process 1000 begins with step 1002, in which a user specifies a crash recovery interval. The crash recovery interval is a single parameter that specifies the maximum time to be spent processing log files during crash recovery. For example, the user may specify D seconds as the acceptable crash recovery interval. If M bytes/sec. is the redo processing rate, this implies that up to MxD bytes of redo records can be processed during crash recovery and still meet the user specified parameter.

It is to be noted that the workload may be such that the user request can not be satisfied. The present invention uses a best-effort strategy, which attempts to satisfy the user request, but avoids generating checkpoints that are not beneficial.

In step 1004, redo data, such as that included in a redo stream is generated by the processing of transactions by the DBMS. Redo stream includes redo data, such as blocks of redo files. In step 1006, checkpointing is performed based on the specified crash recovery interval. In particular, the checkpointing process is triggered by the generation of each block of redo files. Checkpoint information may be generated after each block of redo files. The size of each block of redo files is determined based on the user specified crash recovery interval and on the redo-processing rate of the DBMS. Thus, each block of redo files has a size of M*D/2 bytes of data.

In step 1008, as each block of redo files is generated, it is determined what checkpoint information will be generated at that time. In some cases, no checkpoint information may be generated, in other cases, checkpoint information for some or all transactions may be generated. DML statements related to uncommitted transactions will be checkpointed if and only if the cost of performing the checkpointing is less than the cost of re-reading MxD/2 amount of redo records. In addition, the fact that system crashes are rare events is accounted for by never checkpointing part of a transaction that committed before the checkpointing process is triggered.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for generating checkpointing information in a database management system comprising the steps of:
   generating redo information based on transactions processed by the database management system; and
   in response to generation of a block of redo information, determining whether to take a checkpoint by:
   determining a cost of recovery using the redo information comprising the steps of:
   determining a cost of recovery using the redo information from a first checkpoint to a point in time with no checkpoint between the first checkpoint and the point in time, and
   determining a cost of recovery using the redo information from a first checkpoint to the point in time with a second checkpoint between the first checkpoint and the point in time;
   determining a cost of taking a checkpoint by:
   generating an inadvisable interval list over which a checkpoint is not to be taken by:
   determining an inadvisable checkpoint interval by keeping track of a size of uncheckpointed data contained in a transaction and comparing the size of uncheckpointed data contained in the transaction with a threshold value computed from the user-supplied acceptable delay and acceptable overhead parameters, and inserting an interval relating to the transaction in the inadvisable interval list if the size of uncheckpointed data contained in the transaction exceeds the threshold value, and maintaining the inadvisable interval list as redo records are processed and consumed;

receiving a user specification of acceptable recovery delay and acceptable checkpoint overhead; and taking a checkpoint when cost effective to do so based on the cost of recovery using the redo information, the cost of taking the checkpoint and the user-specified acceptable delay and overhead.

2. The method of claim 1, wherein step of maintaining the inadvisable interval list as redo records are processed and consumed comprises the steps of:

by maintaining a sorted list of all inadvisable checkpoint interval;

removing an interval from the inadvisable list of intervals when a transaction that contributed to the interval is consumed.

3. The method of claim 2, wherein the threshold equals the product of the acceptable recovery delay, the acceptable checkpoint overhead, and a rate of processing of the redo information.

4. The method of claim 3, wherein the step of taking a checkpoint based on the cost of recovery using the redo information and on the cost of taking a checkpoint comprises the step of:

taking the second checkpoint if the cost of recovery using the redo information from a first checkpoint to the point in time with a second checkpoint between the first checkpoint and the point in time is less than the cost of recovery using the redo information from a first checkpoint to the point in time with no checkpoint between the first checkpoint and the point in time.

5. The method of claim 4, further comprising the step of determining the cost-effectiveness of a third checkpoint, comprising the steps of:

checking presence of a timestamp of the third checkpoint in the inadvisable interval list; and determining that the third checkpoint is not cost-effective, if the timestamp of the third checkpoint is present in the inadvisable interval list.

6. A system for generating checkpointing information in a database management system comprising:

a processor operable to execute computer program instructions;

a memory operable to store computer program instructions executable by the processor; and computer program instructions stored in the memory and executable to perform the steps of:

generating redo information based on transactions processed by the database management system; and in response to generation of a block of redo information, determining whether to take a checkpoint by:

determining a cost of recovery using the redo information comprising the steps of:

determining a cost of recovery using the redo information from a first checkpoint to a point in time with no checkpoint between the first checkpoint and the point in time, and determining a cost of recovery using the redo information from a first checkpoint to the point in time with a second checkpoint between the first checkpoint and the point in time;

determining a cost of taking a checkpoint by:

generating an inadvisable interval list over which a checkpoint is not to be taken by:

determining an inadvisable checkpoint interval by keeping track of a size of uncheckpointed data contained in a transaction and comparing the size of uncheckpointed data contained in the transaction with a threshold value computed from the user-supplied acceptable delay and acceptable overhead parameters, and inserting an interval relating to the transaction in the inadvisable interval list if the size of uncheckpointed data contained in the transaction exceeds the threshold value, and maintaining the inadvisable interval list as redo records are processed and consumed;

receiving a user specification of acceptable recovery delay and acceptable checkpoint overhead; and taking a checkpoint when cost effective to do so based on the cost of recovery using the redo information, the cost of taking the checkpoint and the user-specified acceptable delay and overhead.

7. The system of claim 6, wherein step of maintaining the inadvisable interval list as redo records are processed and consumed comprises the steps of:

by maintaining a sorted list of all inadvisable checkpoint interval;

removing an interval from the inadvisable list of intervals when a transaction that contributed to the interval is consumed.

8. The system of claim 7, wherein the threshold equals the product of the acceptable recovery delay, the acceptable checkpoint overhead, and a rate of processing of the redo information.

9. The system of claim 8, wherein the step of taking a checkpoint based on the cost of recovery using the redo information and on the cost of taking a checkpoint comprises the step of:

taking the second checkpoint if the cost of recovery using the redo information from a first checkpoint to the point in time with a second checkpoint between the first checkpoint and the point in time is less than the cost of recovery using the redo information from a first checkpoint to the point in time with no checkpoint between the first checkpoint and the point in time.

10. The system of claim 9, further comprising the step of determining the cost-effectiveness of a third checkpoint, comprising the steps of:

checking presence of a timestamp of the third checkpoint in the inadvisable interval list; and determining that the third checkpoint is not cost-effective, if the timestamp of the third checkpoint is present in the inadvisable interval list.

11. A computer program product for generating checkpointing information in a database management system comprising:

a computer readable storage medium;

computer program instructions, recorded on the computer readable storage medium, executable by a processor, for performing the steps of generating redo information based on transactions processed by the database management system; and in response to generation of a block of redo information, determining whether to take a checkpoint by:
determining a cost of recovery using the redo information comprising the steps of:
determining a cost of recovery using the redo information from a first checkpoint to a point in time with no checkpoint between the first checkpoint and the point in time, and
determining a cost of recovery using the redo information from a first checkpoint to the point in time with a second checkpoint between the first checkpoint and the point in time;
determining a cost of taking a checkpoint by:
generating an inadvisable interval list over which a checkpoint is not to be taken by:
determining an inadvisable checkpoint interval by keeping track of a size of uncheckpointed data contained in a transaction and comparing the size of uncheckpointed data contained in the transaction with a threshold value computed from the user-supplied acceptable delay and acceptable overhead parameters, and
inserting an interval relating to the transaction in the inadvisable interval list if the size of uncheckpointed data contained in the transaction exceeds the threshold value, and
maintaining the inadvisable interval list as redo records are processed and consumed;
receiving a user specification of acceptable recovery delay and acceptable checkpoint overhead; and
taking a checkpoint when cost effective to do so based on the cost of recovery using the redo information, the cost of taking the checkpoint and the user-specified acceptable delay and overhead.

12. The computer program product of claim 11, wherein step of maintaining the inadvisable interval list as redo records are processed and consumed comprises the steps of:
by maintaining a sorted list of all inadvisable checkpoint interval;
removing an interval from the inadvisable list of intervals when a transaction that contributed to the interval is consumed.

13. The computer program product of claim 12, wherein the threshold equals the product of the acceptable recovery delay, the acceptable checkpoint overhead, and a rate of processing of the redo information.

14. The computer program product of claim 13, wherein the step of taking a checkpoint based on the cost of recovery using the redo information and on the cost of taking a checkpoint comprises the step of:
taking the second checkpoint if the cost of recovery using the redo information from a first checkpoint to the point in time with a second checkpoint between the first checkpoint and the point in time is less than the cost of recovery using the redo information from a first checkpoint to the point in time with no checkpoint between the first checkpoint and the point in time.

15. The computer program product of claim 14, further comprising the step of determining the cost-effectiveness of a third checkpoint, comprising the steps of:
checking presence of a timestamp of the third checkpoint in the inadvisable interval list; and
determining that the third checkpoint is not cost-effective, if the timestamp of the third checkpoint is present in the inadvisable interval list.

* * * * *

UNITED STATES PATENT AND TRADEMARK OFFICE
CERTIFICATE OF CORRECTION

PATENT NO. : 7,363,538 B1
APPLICATION NO. : 10/158226
DATED : April 22, 2008
INVENTOR(S) : Kundu et al.

It is certified that error appears in the above-identified patent and that said Letters Patent is hereby corrected as shown below:

In column 4, line 15, after "systems" insert -- . --.

In column 7, line 7, after "y)" insert -- = --.

In column 9, line 45–52, delete "In step..........checkpointed." and insert the same on col. 9, line 46 as a new paragraph.

In column 14, line 65, in claim 11, after "of" insert -- : --.

Signed and Sealed this

Tenth Day of November, 2009

David J. Kappos
*Director of the United States Patent and Trademark Office*